United States Patent [19]

Pipon et al.

[11] Patent Number: 4,898,356

[45] Date of Patent: Feb. 6, 1990

[54] REVERSIBLE ENDLESS SCREW SLIDES AUTHORIZING A MICRO MILLIMETRIC CONTROLLED DISPLACEMENT AND INCLUDING A MEMORY FOR A VEHICLE SEAT

[75] Inventors: Yves Pipon; Georges Droulon, both of Flers, France

[73] Assignee: A. & M. Cousin Etablissements Cousin Freres, Flers, France

[21] Appl. No.: 273,419

[22] Filed: Nov. 18, 1988

[30] Foreign Application Priority Data

Nov. 20, 1987 [FR] France .................................. 87 16103

[51] Int. Cl.$^4$ .............................................. B60N 1/04
[52] U.S. Cl. ..................................... 248/429; 297/344
[58] Field of Search ............... 248/429, 424, 430, 419; 297/341, 344, 340

[56] References Cited

U.S. PATENT DOCUMENTS

| | | | |
|---|---|---|---|
| 3,184,209 | 5/1965 | Colautti | 248/429 |
| 3,940,182 | 2/1976 | Tamura | 297/341 |
| 4,101,169 | 7/1978 | Nuraishi et al. | 297/341 |
| 4,449,752 | 5/1984 | Yasumatsu et al. | 297/341 |
| 4,497,518 | 2/1985 | Nishmura et al. | 297/341 |
| 4,508,385 | 4/1985 | Bowman | 297/341 |
| 4,601,455 | 7/1986 | Lowe et al. | 248/429 |
| 4,621,867 | 11/1986 | Perring et al. | 297/341 |
| 4,652,052 | 3/1987 | Hessler et al. | 297/341 |
| 4,671,571 | 6/1987 | Gionet | 248/429 X |

*Primary Examiner*—Ramon S. Britts
*Assistant Examiner*—Karen J. Chotkowski
*Attorney, Agent, or Firm*—Sherman Levy

[57] ABSTRACT

The reversible endless screw slides are fixed by their lower fixed elements to the vehicle floor via a base plate. The base plate is mounted under at least one of the two slides and carries a profile section forming a rack cooperating with a reversible endless screw and which can be locked by a second shoe. The movement of the second shoe is controlled by a lever able to pivot against action of springs via another lever fast with an articulated control bow placed between the two slides so as to free the endless screw placed in a casing and cooperating with the rack for forming a mechanical memory for the slides.

2 Claims, 3 Drawing Sheets

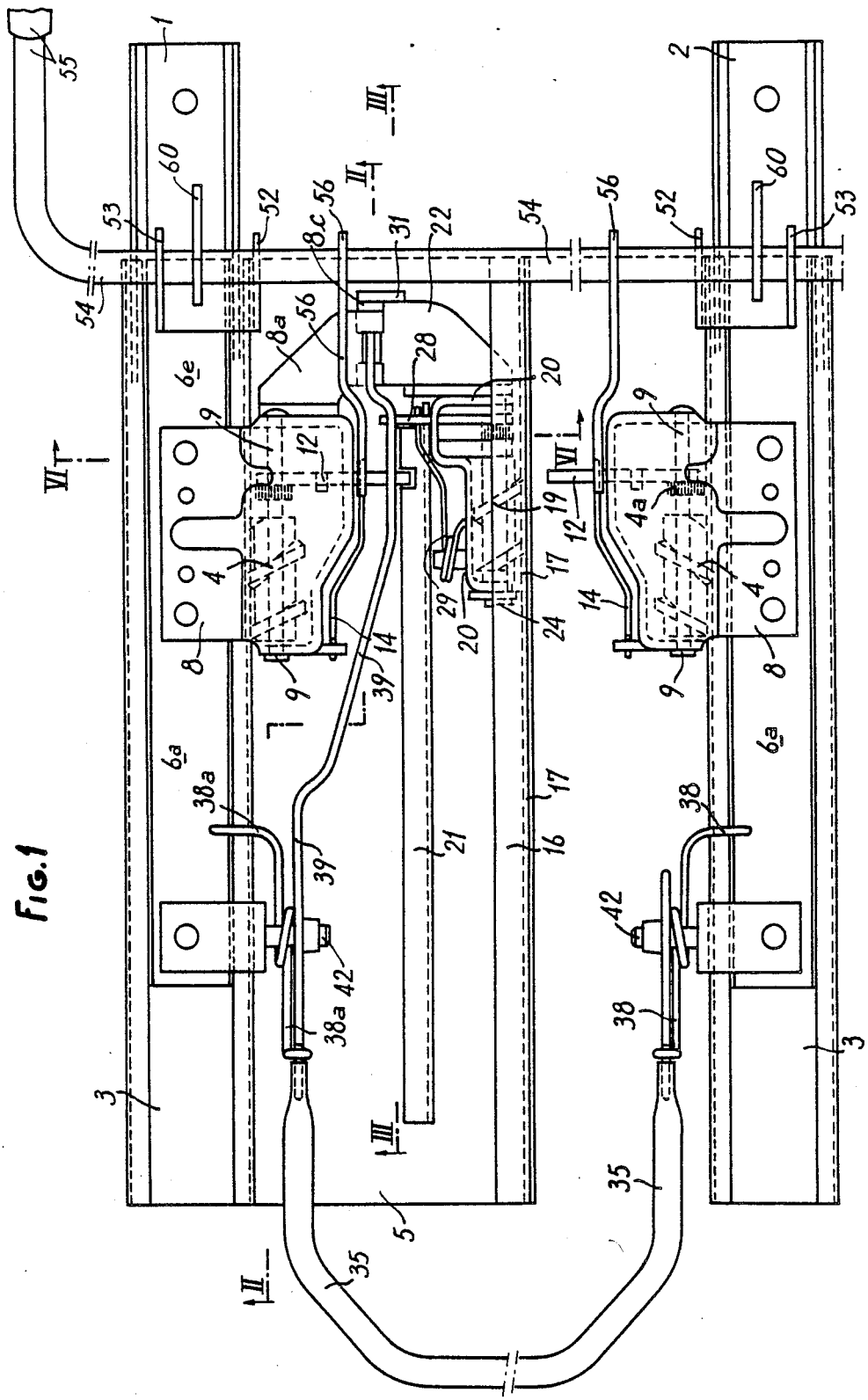

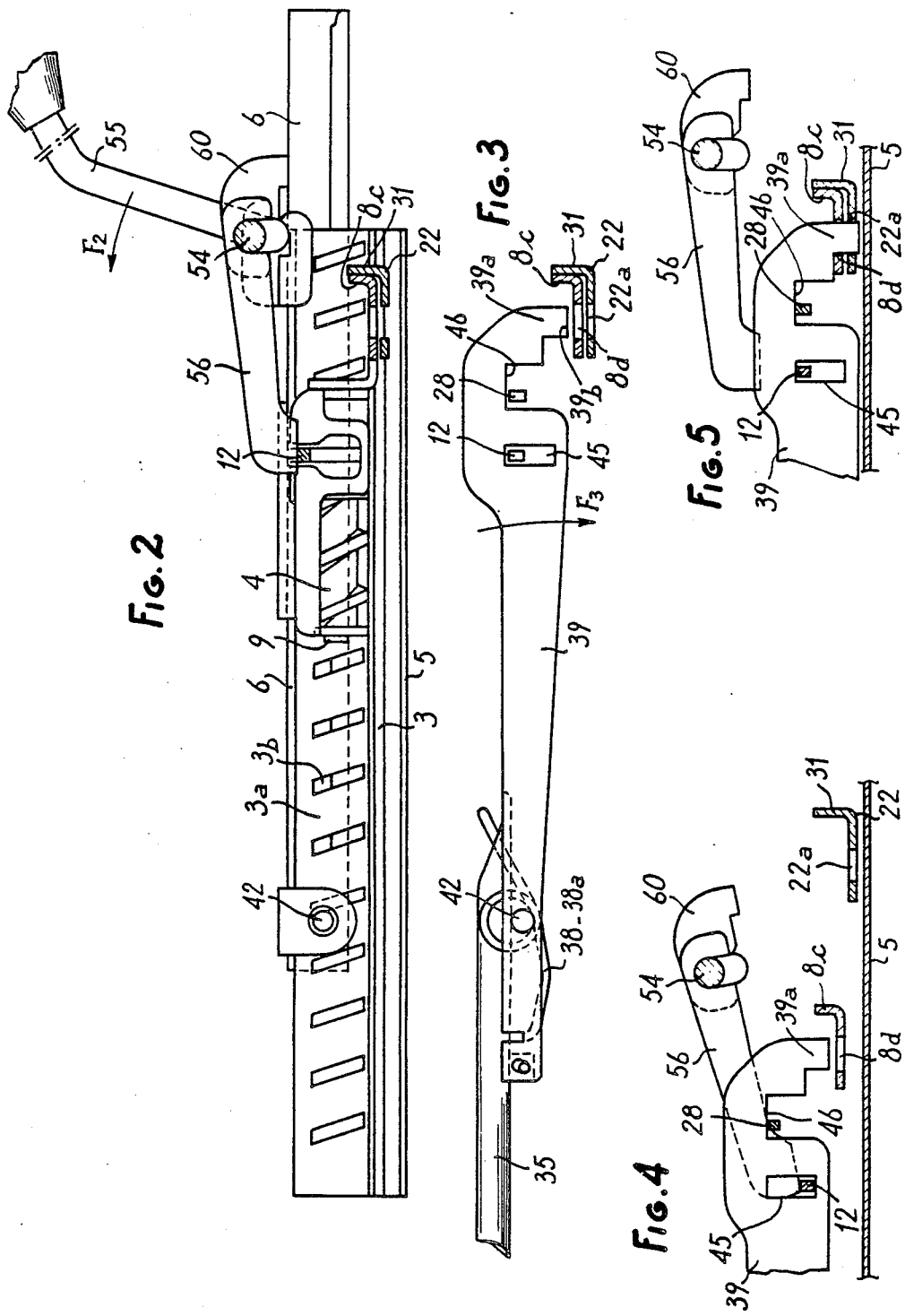

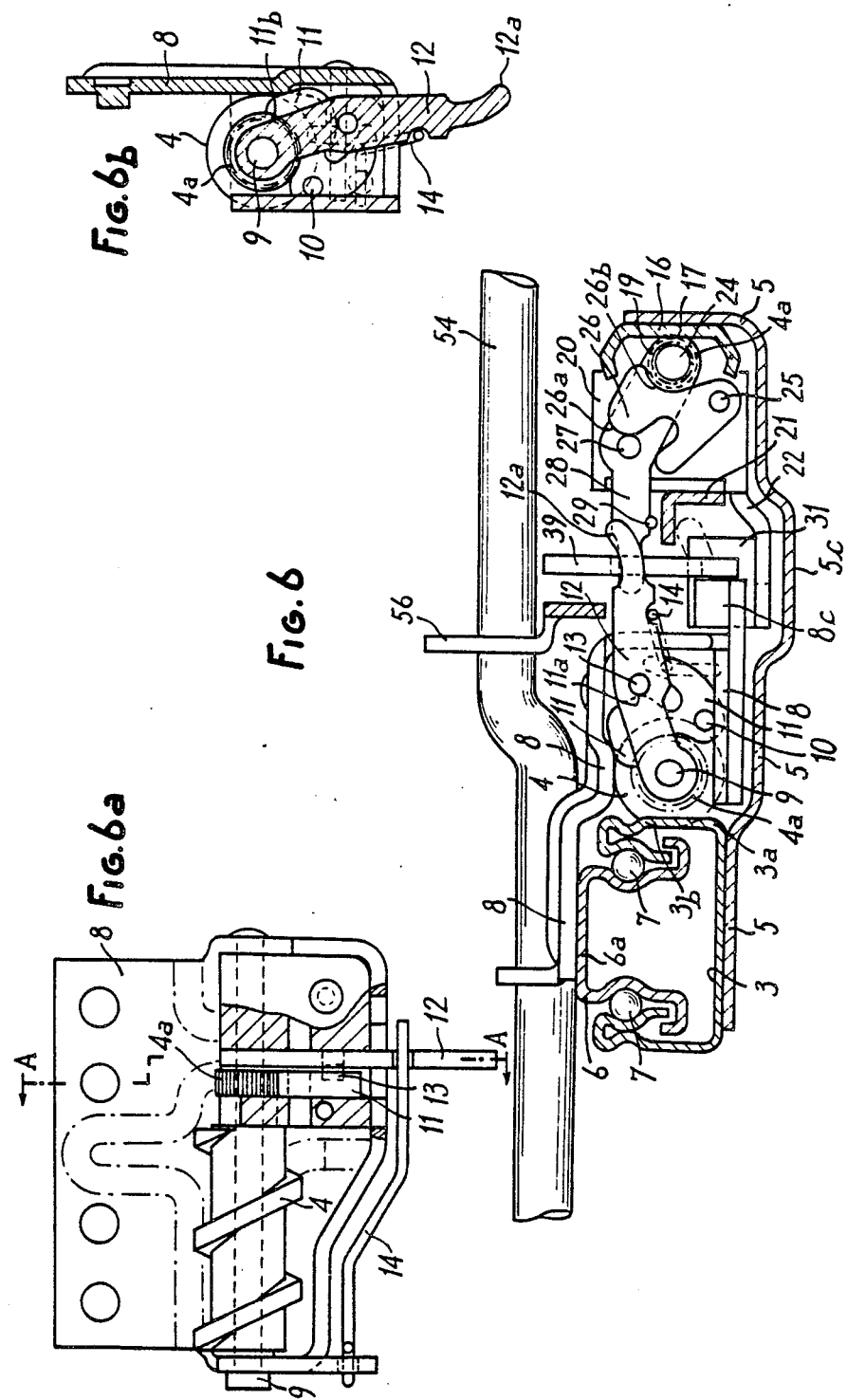

REVERSIBLE ENDLESS SCREW SLIDES AUTHORIZING A MICRO MILLIMETRIC CONTROLLED DISPLACEMENT AND INCLUDING A MEMORY FOR A VEHICLE SEAT

BACKGROUND OF THE INVENTION

Presently, the so-called memory vehicle seat slides can be classified into two groups which are:

manual memory slides whose position which is previously chosen is respected upon a return of the seat after a given displacement. The mechanism which is involved includes at least one rack for setting the seat position in length, and a second mechanism with a second rack, the mobile portion of the second slide being provided for forming the memory; this mechanical system is bulky and not very accurate.

electrically controlled memory slides whose position which is chosen after each displacement of the seat is restored by using an electronic central unit; the construction is then rather heavy, bulky and costly.

In cases where the seat slides do not include a chosen position memory, one has in fact to carry out after each displacement of the seat a new complete setting of the most convenient position of the seat for the user.

However, for two-door vehicles, it is more and more necessary to have, for each front seat, longitudinal setting slides including memories for the positioning of the seat and enabling a rapid temporary displacement of the seat in order to permit the ear passengers of a two-door vehicle to get in or out of the vehicle, and then to bring the front seat involved back to the prior position.

It should be reminded that in case of a so-called manual memory slide, a setting in position of the seat as well as a setting of the memory is dependent on the pitch of the serrations or of the pitch of each slide rack; therefore, the position of the seat can be obtained only with an approximate setting taking into account the pitch of the serrations or the pitch of the rack.

In the case of an electrically controlled memory slide, the positioning is very precise and can be called of a micro-millimetric controlled type.

OBJECT OF THE INVENTION

The object of the present invention is to provide an assembly of two mechanically controlled slides including a memory, also of a mechanical type, but which uses a reversible endless screw, for a displacement of the mobile portion of the slides as well as for the memory, which reversible endless screw cooperates with a rack so as to permit a so-called micro-millimetric setting of the position of each seat by a manual phase.

A return of the seat to the micro-millimetric previously chosen position is obtained by defining a position of a memory, the displacement of which is controlled by a screw, also provided with a pitch enabling its reversibility and placed parallel to the slides.

SUMMARY OF THE INVENTION

According to the invention, the reversible endless screw slides enabling a micro-millimetric displacement and including a memory for a vehicle seat in which two parallel slides, each constituted by a lower fixed element and an upper mobile element, are fixed by their lower fixed elements to the vehicle floor via a base plate, one of the slides having on a lower vertical portion of the lower fixed element a rack cooperating with a first reversible endless screw freely mounted on a pin fast with a box fixed on an upper portion of the upper mobile element for controlling a displacement of the slides, locking means of the first endless screw by a first shoe being provided through action of a first lever, wherein the base plate carries also, between the two slides, a profile section forming a second rack cooperating with a second reversible endless screw and which can be locked by a second shoe, movement of the second shoe being controlled by a second lever, the first and second levers being able to pivot against action of springs via a third lever fast with an articulated control bow placed between the two slides so as to free the first endless screw locking the slides and the second endless screw placed in a casing and cooperating with the second rack for forming a slide mechanical memory; both the box and the casing carrying abutment parts so as to bring in coincidence a position of the box controlling the displacement of the slides with the casing constituting the slide mechanical memory, a fourth lever being mounted on a shaft controlling an unlocking of the first lever and therefore of the first endless screw and enabling to displace the upper mobile elements of the slides without changing a position of the casing constituting the slide mechanical memory.

According to another feature of the invention, during a lowering of the third lever under action of the control bow, a rear end of the third lever which has a nose shape cooperates with openings formed in the abutment parts limiting a displacement of the memory and of the slides by penetration of the nose shape in the openings while enabling a simultaneous displacement of the mobile elements of the slide and of the slide mechanical memory constituted by the casing moved along the second rack via the second reversible endless screw.

Various other features of the invention will become more apparent from the detailed following description.

BRIEF DESCRIPTION OF THE DRAWINGS

An embodiment of the invention is shown, by way of a non limiting example, in the accompanying drawings, wherein:

FIG. 1 is a plan view of slides including a memory for a vehicle seat, according to the invention;

FIG. 2 is a side elevation view, partly in cross-section, taken along line II—II of FIG. 1;

FIG. 3 is a side elevation view, taken along line III—III of FIG. 1, of one of the control members of the slide with a memory according to the invention;

FIG. 4 shows the locking members connecting the slides with the memory, the slides being in a free position;

FIG. 5 shows the locking members of the slides, the memory being in the locking position in order to permit its entrainment to the chosen position of use.

FIG. 6 is an enlarged cross sectional view taken along line VI—VI of FIG. 1;

FIG. 6a is an enlarged plan view of a portion of FIG. 6;

FIG. 6b is a cross sectional view taken along line A—A of FIG. 6a.

DETAILED DESCRIPTION OF THE INVENTION

FIG. 1 shows two parallel slides 1, 2 provided for the longitudinal setting of a seat. As better shown in FIG. 6, the fixed lower element 3 of the slide 1 has, in a known manner, a vertical portion 3a with a rack 3b which is most often formed by slightly inclined serrations provided for cooperating with a reversible endless screw 4 (see FIG. 2).

In the case of FIG. 1, the right hand slide 1 is provided to be fixed via a base plate 5 on the floor of a vehicle.

The upper mobile element 6 of each slide 1 or 2 is held in the fixed lower element 3 through a series of balls 7 which are spaced apart by rods, in a known manner.

Moreover, a top 6a of the upper mobile element 6 of the slide 1 carries an iron fitting forming a box 8 (see FIGS. 1, 6, 6a, 6b) in which are mounted, on the one hand, a pin 9 around which freely rotates the endless screw 4 and, on the other hand, a pin 10 on which is mounted a shoe 11 formed with a toothing 11b provided for meshing with a toothed circular portion 4a fast with the endless screw 4 for braking and locking the endless screw 4. Actually a lever 12 articulated on the pin 9 of the endless screw 4 locks the shoe 11 via a lug 13 cooperating with a cam-shaped portion 11a of the shoe 11. The lever 12 is permanently lifted, meaning that it tends to lock the shoe 11 on the toothed circular portion 4a of the endless screw 4 by means of a spring 14 (see FIGS. 1, 6, 6a and 6b).

In the example shown the slide 2 does not comprise a locking system between the upper element 6 and the lower element 3, the positioning being obtained by cooperation of an endless screw, shown at 4, with the rack 3b.

The base plate 5 carries, in its portion turned toward the other slide 2 (see FIG. 1), a profile section 16 in which there is provided a rack 17 obtained by inclined parallel cut-outs or openings, which rack 17 coooperates with a second endless screw 19 mounted in a casing 20 (see FIGS. 1 and 6). The casing 20 is fixed to a profile section 21 which is a part of a longitudinal guide member 22 able to slide from front to rear with respect to the iron fitting 8 which is fast with the top 6a of the upper mobile element 6 of the slide 1.

As in the previous case, the endless screw 19 is mounted on a pin 24 carried by the casing 20 which contains also a pin 25 about which can pivot a shoe 26 formed with a cam-shaped portion 26a adapted for cooperating with a lug 27 carried by a lever 28 articulated on the pin 24 and returned upwardly by a spring 29. Locking of the endless screw 19 is effected in the same manner as for the endless screw 4.

In the present case, the longitudinal guide 22, placed underneath the casing 20, can be supported by a raceway (not shown) constituted for example by one or several needles rolling on a portion 5c of the base plate 5, and thereby providing a perfect holding for the longitudinal guide 22.

As this is shown in FIG. 1, the longitudinal guide 22 carries, in its rear portion, a part 30 ended by a vertical shoe 31 forming an abutment. Likewise, the box 8 containing the endless screw 4 comprises in its rear portion a part 8a conveniently fixed thereto and having a vertical abutment 8c adapted for cooperating with the vertical shoe 31 of the part 30 (see FIG. 1).

A control bow 35 is further mounted on the front face of the slide elements 3, which control bow 35 pivots on pins 40, 42 rigidly connected to the lateral sides of the upper mobile elements 6.

Moreover, the control bow 35 is subjected (in a manner known per se) to action of two springs 38, 38a having a tendency to lowering the control bow 35 (see FIGS. 1 and 3) in direction of the vehicle floor.

The lever 39 which is offset in the horizontal plane as shown in FIG. 1, bears via an opening 45 and a step portion 46 (see FIGS. 3, 4, 5) on the levers 12 and 28 controlling the locking members of the endless screws 14 and 19. The rear end 39a of the lever 39 penetrates via a nose 39b in openings 8d and 22a of abutments 8c, 31 in order to rigidly connect the abutments 8c and 31 when the seat is set in the position chosen by the user.

As shown in FIG. 1, lugs 52, 53 are provided on a rear portion 6e of the upper mobile element 6 of the slide 1, the lugs 52, 53 being formed with holes for the passage of a shaft 54 provided with an operating handle 55.

The shaft 54 controls a smaller lever 56 having a front end which bears on the lever 12.

Assuming a user of the seat has conveniently set the position in length of the seat, the various members of the slides 1 and 2 as well as the memory constituted by the rack 17 and endless screw 19 occupy the position shown in FIGS. 1 and 6. The endless screws 4 and 19 are locked by the shoes 11 and 26.

In order to permit the passengers to get inside the rear of a two-door vehicle, it is necessary to frontwardly displace the front seat or seat. The force in direction of arrow F2 (see FIG. 2) applied on the lever 55 acts via the lever 56 on the locking lever 12 of the endless screw 4 placed on the slide 1. The endless screw 4 being freed by this action, it is possible to frontwardly move the seat.

In order to avoid having to maintain the lever 55 during a frontwardly sliding movement of the seat, the shoe 11 is maintained underneath the cam-shaped portion 11a by the end of the lever 12a bearing thereupon and sliding underneath the profile member 21, preventing thereby the lever 12 from resuming its position and thereby preventing any inadvertant latching.

It should however be noted that the lever 55 can be replaced either by a control member placed at a top of the seat back, or by a control member placed at the rear of the seat.

During the unlocking by a return action, the shoe 11, under action of the spring 14 when the seat has resumed its first position, locks the endless screw 4 in the chosen position since the settable abutment 8c has come in engagement with the vertical support 31 of the memory.

There is thus avoided to apply stresses to the locking toothing of the endless screw 4.

In case, it is necessary to carry out a complete setting of the seat with a displacement of the memory, the user sitting on the seat lifts up the control bow 35 against action of the springs 38, 38a, the effect of which is to tip the lever 39 against action of the springs 38, 38a in the direction of arrow F3 (FIG. 3).

The lever 39, while pivoting in direction of the arrow F3 (see FIG. 3) locks the abutments 8c, 31 (see FIG. 5) via its nose 39b and at the same time lowers the levers 12, 28, thereby unlocking the endless screws 4 and 19. The slides 1 and 2 as well as the memory are therefore free, and the endless screws 4 and 19 can rotate freely in the racks 3a, 17 and assume the chosen position with a micro-millimetric displacement, thereby providing an absolute comfort to the passenger. As soon as the passenger ceases his action on the control bow 35, the various members resume the positions shown in FIGS. 1 and 3 under action of the springs 38, 38a. The endless screws 4, 19 are locked again since the levers 39 and 56 have returned to their initial position.

The control bar 54 comes back to its rest position under effect of a spring (not shown) and is held in this position by an abutment 60 which bears on a top of the upper slide 1.

What is claimed is:

1. Reversible endless screw slides enabling a micro-millimetric displacement and including a memory for a vehicle seat in which two parallel slides (1,2), each constituted by a lower fixed element (3) and an upper mobile element (6), are fixed by their lower fixed elements (3) to the vehicle floor via a base plate (5), one (1) of the slides having on a lower vertical portion (3a) of the lower fixed element (3) a rack (3b) cooperating with a first reversible endless screw (4) freely mounted on a pin (9) fast with a box (8) fixed on an upper portion of the upper mobile element (6) for controlling a displacement of the slides (1, 2), locking means of the first endless screw (4) by a first shoe (11) being provided through action of a first lever (12), wherein the base plate (5) is mounted under at least one of the two slides and carries also, between the two slides (1, 2), a profile section (16) forming a second rack cooperating with a second reversible endless screw (19) and which can be locked by a second shoe (26), movement of the second shoe being controlled by a second lever (28), the first and second levers (12 and 28) being able to pivot against action of springs (14, 29) via a third lever (39) fast with an articulated control bow (35) placed between the two slides (1, 2) so as to free the first endless screw (4) locking the slides (1, 2) and the second endless screw (19) placed in a casing (20) and cooperating with the second rack for forming a slide mechanical memory; both the box (8) and the casing (20) carrying abutment parts (8a, 22, 8c, 31) so as to bring in coincidence a position of the box (8) controlling the displacement of the slides (1, 2) with the casing (20) constituting the slide mechanical memory, a fourth lever (56) being mounted on a shaft (54) controlling an unlocking of the first lever (12) and therefore of the first endless screw (4) and enabling to displace the upper mobile elements (6) of the slides without changing a position of the casing (20) constituting the slide mechanical memory.

2. Reversible endless screw slides according to claim 1, wherein, during a lowering of the third lever (39) under action of the control bow (35), a rear end of the third lever (39) which has a nose shape (39a) cooperates with openings (8d, 22a) formed in the abutment parts (8c, 22a) limiting a displacement of the memory and of the slides by penetration of the nose shape (39a) in the openings while enabling a simultaneous displacement of the mobile elements of the slides (1, 2) and of the slide mechanical constituted by the casing (20) moved along the second rack (17) via the second reversible endless screw (19).

* * * * *